(12) United States Patent  
Lee (10) Patent No.: US 7,775,700 B2  
(45) Date of Patent: Aug. 17, 2010

(54) TURNING FILM USING ARRAY OF ROOF PRISM STRUCTURES

(75) Inventor: Junwon Lee, Webster, NY (US)

(73) Assignee: Rohm and Haas Electronics Materials LLC, Marlborough, MA (US)

( * ) Notice: Subject to any disclaimer, the term of this patent is extended or adjusted under 35 U.S.C. 154(b) by 548 days.

(21) Appl. No.: 10/956,566

(22) Filed: Oct. 1, 2004

(65) Prior Publication Data

US 2006/0072203 A1 Apr. 6, 2006

(51) Int. Cl.
*F21V 8/00* (2006.01)

(52) U.S. Cl. .................. 362/618; 362/561; 362/620

(58) Field of Classification Search ............... 362/618, 362/620, 561, 511, 330; 359/833–837
See application file for complete search history.

(56) References Cited

U.S. PATENT DOCUMENTS

| | | | |
|---|---|---|---|
| 2,167,149 A * | 7/1939 | Grote | 40/582 |
| 3,535,025 A * | 10/1970 | Shannon | 359/837 |
| 3,829,680 A | 8/1974 | Jones | |
| 4,906,070 A * | 3/1990 | Cobb, Jr. | 359/834 |
| 5,035,486 A * | 7/1991 | Inokuchi | 359/625 |
| 5,237,446 A * | 8/1993 | Takahashi | 359/359 |
| 5,300,263 A | 4/1994 | Hoopman et al. | |
| 5,396,350 A | 3/1995 | Beeson et al. | |
| 5,592,332 A | 1/1997 | Nishio et al. | |
| 5,611,611 A | 3/1997 | Ogino et al. | |
| 5,629,784 A | 5/1997 | Abileah et al. | |
| 5,640,483 A | 6/1997 | Lin | |
| 5,839,823 A | 11/1998 | Hou et al. | |
| 5,854,872 A | 12/1998 | Tai | |
| 5,887,964 A | 3/1999 | Higuchi et al. | |
| 5,917,664 A | 6/1999 | O'Neill et al. | |
| 6,111,696 A | 8/2000 | Allen et al. | |
| 6,277,471 B1 | 8/2001 | Tang | |
| 6,280,063 B1 | 8/2001 | Fong et al. | |
| 6,356,391 B1 | 3/2002 | Gardiner et al. | |
| 6,576,887 B2 | 6/2003 | Whitney et al. | |
| 6,707,611 B2 | 3/2004 | Gardiner et al. | |
| 2001/0053075 A1 | 12/2001 | Parket et al. | |
| 2002/0141060 A1 * | 10/2002 | Lu et al. | 359/530 |

FOREIGN PATENT DOCUMENTS

JP 7-114025 5/1995

* cited by examiner

*Primary Examiner*—Sharon E Payne
(74) *Attorney, Agent, or Firm*—Edwin Oh (57) ABSTRACT

The invention generally relates to an optical turning film for providing light redirection, comprising:
(a) an input surface for accepting incident light comprising a plurality of roof prism structures arranged in a two-dimensional array; and,
(b) a substantially planar output surface.

9 Claims, 11 Drawing Sheets

TURNING FILM USING ARRAY OF ROOF PRISM STRUCTURES

FIELD OF THE INVENTION

This invention generally relates to display illumination articles for enhancing luminance from a two-dimensional surface and more particularly relates to a two-dimensional turning film employing an array of roof prism structures to redirect light from a light guiding plate.

BACKGROUND OF THE INVENTION

While LCD displays offer a compact, lightweight alternative to CRT monitors, there are many applications for which LCD displays are not satisfactory due to a low level of brightness, or more properly, luminance. The transmissive LCD used in conventional laptop computer displays is a type of backlit display, having a light-providing surface positioned behind the LCD for directing light outwards, towards the LCD. The light-providing surface itself provides illumination that is essentially Lambertian, that is, having an essentially constant luminance over a broad range of angles. With the goal of increasing on-axis and near-axis luminance, a number of brightness enhancement films have been proposed for redirecting a portion of this light having Lambertian distribution toward normal, relative to the display surface. Among proposed solutions for brightness or luminance enhancement for use with LCD displays and with other types of backlit display types are the following:

U.S. Pat. No. 5,592,332 (Nishio et al.) discloses the use of two crossed lenticular lens surfaces for adjusting the angular range of light in an LCD display apparatus;

U.S. Pat. No. 5,611,611 (Ogino et al.) discloses a rear projection display using a combination of Fresnel and lenticular lens sheets for obtaining the desired light divergence and luminance;

U.S. Pat. No. 6,111,696 (Allen et al.) discloses a brightness enhancement film for a display or lighting fixture. With the optical film disclosed in the '696 patent, the surface facing the illumination source is smooth; the opposite surface has a series of structures, such as triangular prisms, for redirecting the illumination angle. The film disclosed in the '696 patent refracts off-axis light to provide a degree of correction for directing light at narrower angles. However, this film design works best for redirecting off-axis light; incident light that is normal to the film surface may be reflected back toward the source, rather than transmitted;

U.S. Pat. No. 5,629,784 (Abileah et al.) discloses various embodiments in which a prism sheet is employed for enhancing brightness, contrast ratio, and color uniformity of an LCD display of the reflective type. In an embodiment disclosed in the '784 patent, the brightness enhancement film similar to that of the Allen et al. '696 patent is arranged with its structured surface facing the source of reflected light for providing improved luminance as well as reduced ambient light effects. Because this component is used with a reflective imaging device, the prism sheet of the '784 disclosure is placed between the viewer and the LCD surface, rather than in the position used for transmissive LCD systems (that is, between the light source and the LCD);

U.S. Patent Application Publication No. 2001/0053075 (Parker et al.) discloses various types of surface structures used in light redirection films for LCD displays, including prisms and other structures;

U.S. Pat. No. 5,887,964 (Higuchi et al.) discloses a transparent prism sheet having extended prism structures along each surface for improved back-light propagation and luminance in an LCD display. As is noted with respect to the Allen et al. '696 patent mentioned above, much of the on-axis light is reflected rather than transmitted with this arrangement. Relative to the light source, the orientation of the prism sheet in the Higuchi et al. '964 disclosure is reversed from that used in the '696 disclosure. The arrangement shown in the '964 disclosure is usable only for small, hand-held displays and does not use a Lambertian light source;

U.S. Pat. No. 6,356,391 (Gardiner et al.) discloses a pair of optical turning films for redirecting light in an LCD display, using an array of prisms, where the prisms can have different dimensions;

U.S. Pat. No. 6,280,063 (Fong et al.) discloses a brightness enhancement film with prism structures on one side of the film having blunted or rounded peaks;

U.S. Pat. No. 6,277,471 (Tang) discloses a brightness enhancement film having a plurality of generally triangular prism structures having curved facets;

U.S. Pat. No. 5,917,664 (O'Neill et al.) discloses a brightness enhancement film having "soft" cutoff angles in comparison with conventional film types, thereby mitigating the luminance change as viewing angle increases;

U.S. Pat. No. 5,839,823 (Hou et al.) discloses an illumination system with light recycling for a non-Lambertian source, using an array of microprisms; and, U.S. Pat. No. 5,396,350 (Beeson et al.) discloses a backlight apparatus with light recycling features, employing an array of microprisms in contact with a light source for light redirection in illumination apparatus where heat may be a problem and where a relatively non-uniform light output is acceptable.

While conventional approaches, such as those noted in the disclosures mentioned hereinabove, provide some measure of brightness enhancement at low viewing angles, these approaches have some shortcomings. Some of the solutions noted above are more effective for redistributing light over a preferred range of angles rather than for redirecting light toward normal for best on-axis viewing. Conventional brightness enhancement film solutions have a directional bias, working best for redirecting light in one direction. For example, a brightness enhancement film may redirect the light path in a width direction relative to the display surface, but have little or no effect on light in the orthogonal length direction. As a result, multiple orthogonally crossed sheets must be overlaid in order to redirect light in different directions, typically used for redirecting light in both horizontal and vertical directions with respect to the display surface. Necessarily, this type of approach is somewhat a compromise; such an approach is not optimal for light in directions diagonal to the two orthogonal axes.

As disclosed in the patent literature listed above, brightness enhancement articles have been proposed with various types of refractive surface structures formed on the top surface of a substrate material, including arrangements employing a plurality of protruding prism shapes, both as matrices of separate prism structures and as elongated prism structures, with the apex of prisms both facing toward and facing away from the light source. For the most part, these solutions still exhibit directional bias, requiring the use of multiple sheets in practical applications.

One problem with existing backlight systems for portable equipment relates to the need to redirect light from a compact source, such as a CCFL bulb, uniformly over a two-dimensional surface, wherein the light source is positioned at one edge of the two-dimensional surface. Conventional light guide panels perform this function using printed dot patterns or etched surfaces in combination with a diffusion film to diffuse light from the edge source and provide uniform backlight illumination. Directional turning films, such as that provided with the HSOT (Highly Scattering Optical Transmission) light guide panel available from Clarex, Inc., provide an improved solution for providing a uniform backlight of this type, without the need for diffusion films or for dot printing in manufacture. HSOT light guide panels and other types of directional turning films use arrays of prism structures, in various combinations, to redirect light from a light guiding plate toward normal, relative to the two-dimensional surface.

Figure 1:
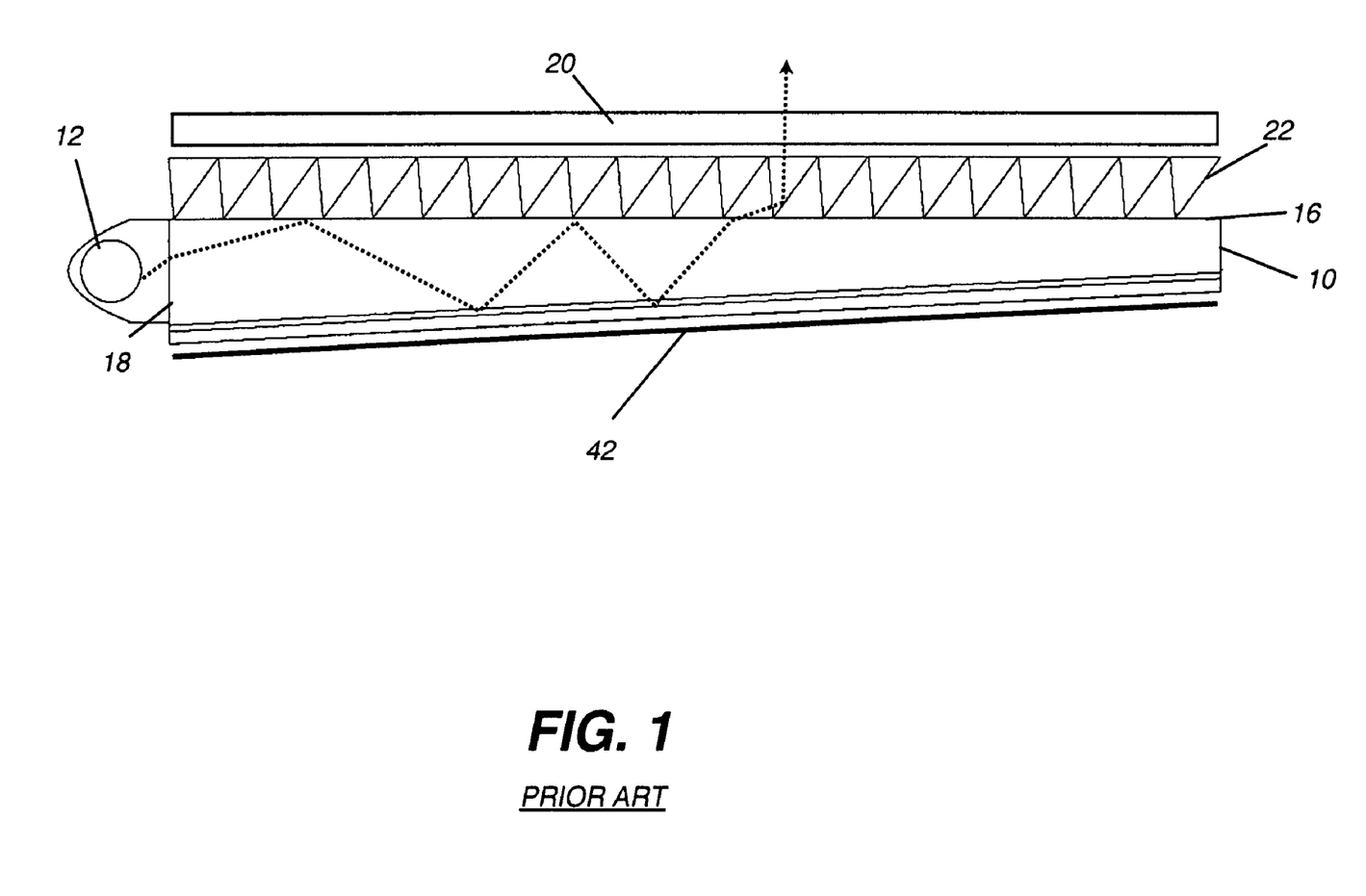
FIG. 1 is a block diagram side view showing the basic redirection function of an existing light guiding plate with separate collimation and redirection mechanisms.

Referring to FIG. 1, the overall function of a light guiding plate 10 is shown. Light from a light source 12 is incident at an input surface 18 and passes into light guiding plate 10, which is typically wedge-shaped as shown. The light propagates within light guiding plate 10 until Total Internal Reflection (TIR) conditions are frustrated and then, possibly reflected from a reflective surface 42, exits light guiding plate at an output surface 16. This light then goes to a turning film 22 and is directed to illuminate a light-gating device 20 such as an LCD or other two-dimensional backlit component.

Figure 2:
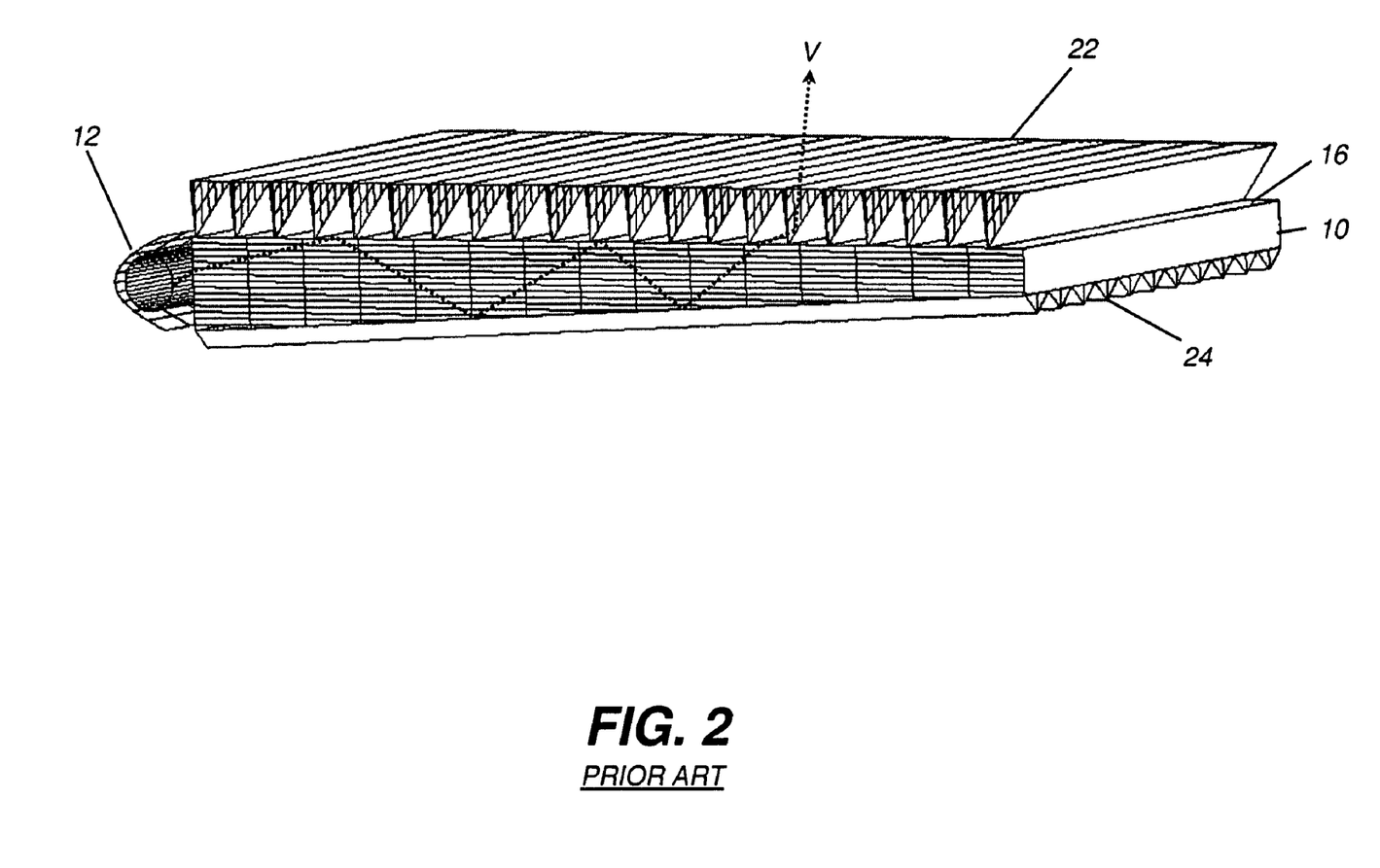
FIG. 2 is a perspective view showing one conventional arrangement for LCD illumination using separate collimation and redirection mechanisms.

For distributing the light along a two-dimensional surface, light guiding plate 10 and its support components are typically designed to provide both redirection of the light and some amount of collimation that reduces divergence of the beam angle. For example, U.S. Pat. No. 5,854,872 entitled "Divergent Angle Rotator System and Method for Collimating Light Beams" to Tai discloses a light guiding plate that uses an array of elongated microprisms to redirect and collimate light from one or more light sources. In the device disclosed in the Tai '872 patent, the light guiding plate has a first set of prism structures on the light output side elongated in one direction to provide collimation and a second set of prism structures on the opposing side elongated in the orthogonal direction and providing collimation and TIR reflection. Referring to FIG. 2, the arrangement of crossed prism structures is shown for a light guiding plate 10 of this type. Turning film 22 on output surface 16 provides redirection of light toward the normal viewing axis V. The light output from light guiding plate 10 can have a relatively high off-axis angle. Bottom prisms 24 provide collimation in the orthogonal direction. The orthogonal relationship of prism structures on top and bottom surfaces provides a controllable degree of collimation of the output light.

There are a number of variations applied to the basic arrangement represented in FIG. 2. For example, U.S. Pat. No. 6,576,887 entitled "Light Guide for use with Backlit Display" to Whitney et al. discloses a light guide optimized for uniformity, in which structures on the output surface of a turning film 22 may be randomly distributed to provide a more uniform output. U.S. Pat. No. 6,707,611 entitled "Optical Film with Variable Angle Prisms" to Gardiner et al. discloses adaptation of an optical turning film with an arrangement that reduces perceived ripple.

Figure 3A:
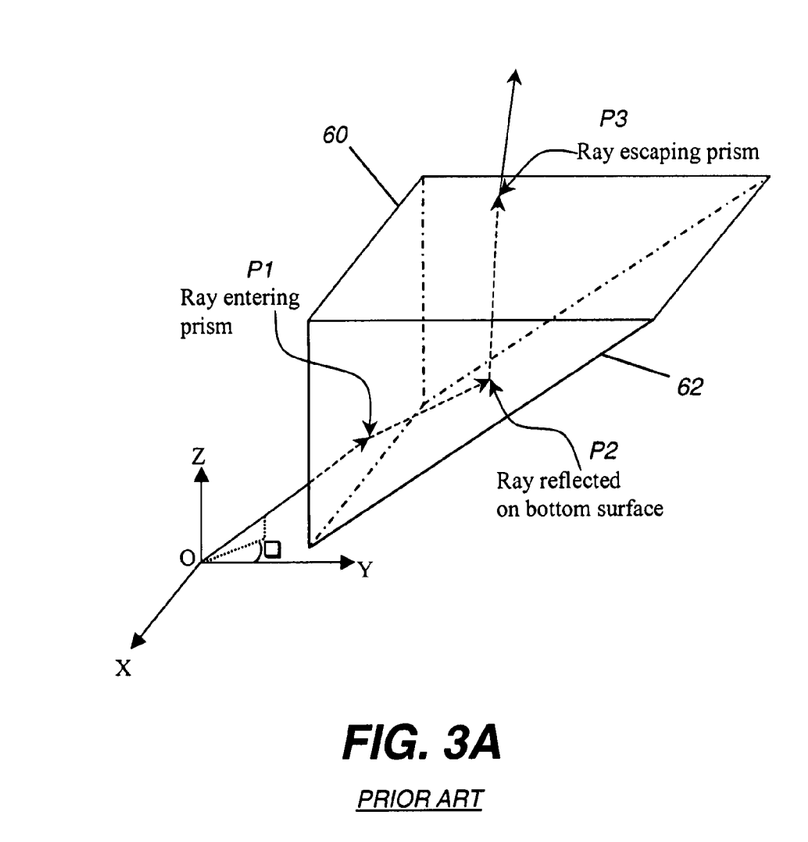
FIGS. 3A and 3B are perspective views showing the overall behavior of prism structures in a conventional turning film.
Figure 3B:
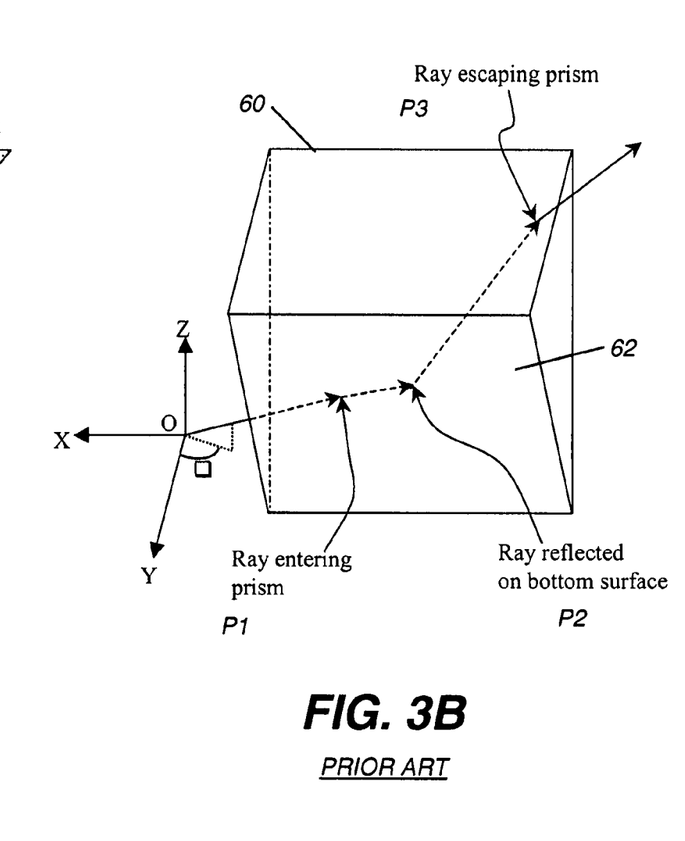

Referring to FIGS. 3A and 3B, there is shown, from two different, approximately orthogonal perspectives, the overall function of a prism 60 for redirecting light, such as would be performed by a conventional turning film. Light entering prism 60 at an incident point P1 is refracted and reflected from a point P2 on a bottom facet 62 by Total Internal Reflection (TIR), then escapes prism 60 at a point P3. It is significant to note that prism 60 provides this turning function effectively in one direction, the Y-direction in the coordinate system shown in FIGS. 3A and 3B. In an orthogonal direction, the X-direction of FIGS. 3A and 3B, prism 60 is ineffective for light collection, resulting in a large divergence along the X-direction. For this reason, as FIG. 2 and as both Tai '872 and Whitney et al. '887 disclosures cited above show, two separate orthogonally disposed sets of prisms are employed in conventional solutions for light redirection. One set of prisms provides collimation of the light, the other set provides beam redirection for a direction. While this arrangement is workable, it can be appreciated that there would be cost and size advantages to an illumination solution that provides both collimation and beam redirection in a single optical component, particularly where such a solution provides improved on-axis luminance. With increased demands for more compact packaging of electronic display apparatus and for improved brightness, and with little promise of dramatic improvement to existing light-scattering approaches for backlight delivery, there is a compelling need to seek out unconventional solutions for light redirection along a two-dimensional surface, particularly well suited to backlighting applications.

SUMMARY OF THE INVENTION

It is an object of the present invention to provide a two-dimensional backlighting solution that is simpler than conventional solutions and provides both redirection and collimation in a single component. With this object in mind, the present invention provides a turning film for providing light redirection comprising a two-dimensional array of roof prism structures.

It is a feature of the present invention that it provides both light collimation and light redirection from a single array structure.

It is an advantage of the present invention that it can provide a more compact solution for displays than conventional brightness enhancement films provide, and combines the functions of light collimation and light redirection from a single component.

It is a further advantage of the present invention that it provides higher levels of on-axis brightness than are available using conventional turning film solutions.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Roof prisms, also termed dach prisms, provide right-angle deflection of incident light in various applications and are widely used in binoculars and other optical apparatus, particularly where compact packaging is desirable. As one example, U.S. Pat. No. 6,667,997 entitled "Optical Module and Method of Making the Same" to Nasu et al. discloses the deployment of a roof prism in a semiconductor laser module. Linear arrays of roof prisms have been disclosed for use in optical writing apparatus, such as that described in U.S. Patent Application Publication 2003/0007067 entitled "Imaging Device Array, Optical Writing Unit and Image Forming Apparatus" by Masuda et al.; in U.S. Pat. No. 5,907,438 entitled "Imaging Device" to Fujita et al.; and in Japanese Patent Application JP2003337300 entitled "Image-Formation Optical System, Optical Writing Unit, and Image Forming Apparatus" by Masuda et al. A two-dimensional array of roof prism structures used for directing light to a sensor is disclosed in U.S. Patent Application 2003/0218125 entitled "Sensor Using Roof Mirror/Roof Prism Array Scale and Apparatus Equipped with the Sensor" by Igaki et al.

Thus, as shown in the patent literature cited above, linear and two-dimensional arrays of roof prisms have been employed to redirect light in support of corresponding arrays of photosensitive components or arrays of image-recording components in specialized applications. However, probably due to their relatively complex arrangement of surfaces, roof prism arrays have been overlooked for use in backlighting illumination systems. As is shown in the following description, the roof prism array not only provides a solution that simplifies the design of support components for light guide plate 10 (FIGS. 1 and 2) and helps to reduce component count for backlight illumination. At the same time, a roof prism array also provides unanticipated improvements in on-axis luminance.

Figure 4A:
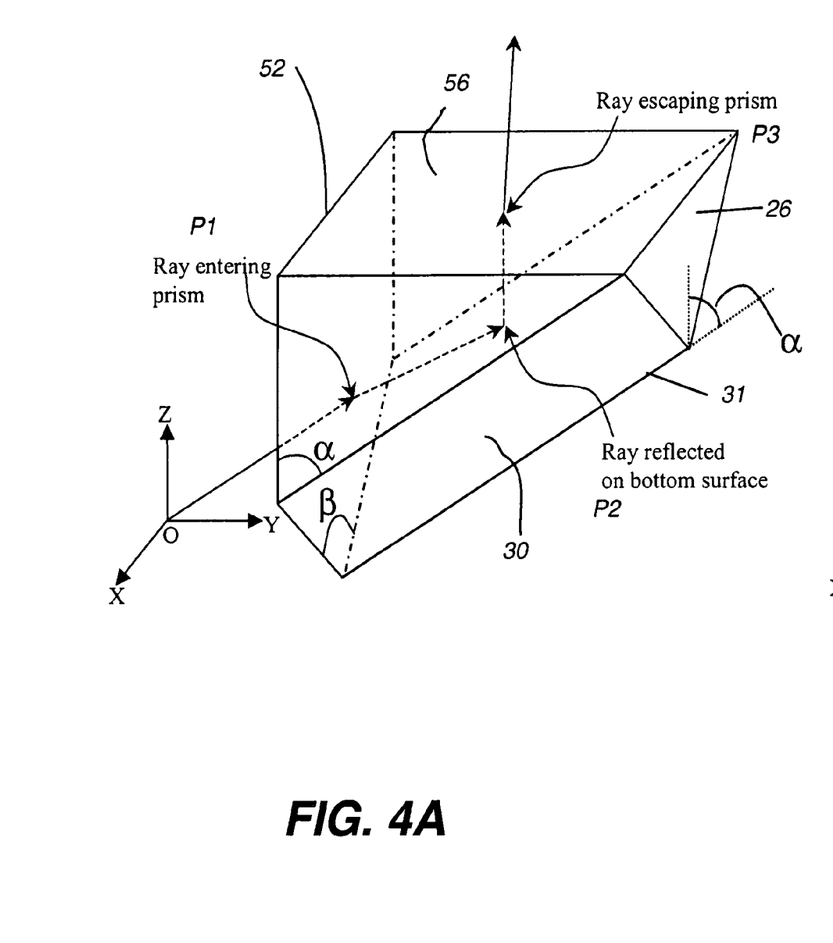
FIGS. 4A and 4B are perspective views showing the overall behavior of roof prism structures in a turning film according to the present invention.
Figure 4B:
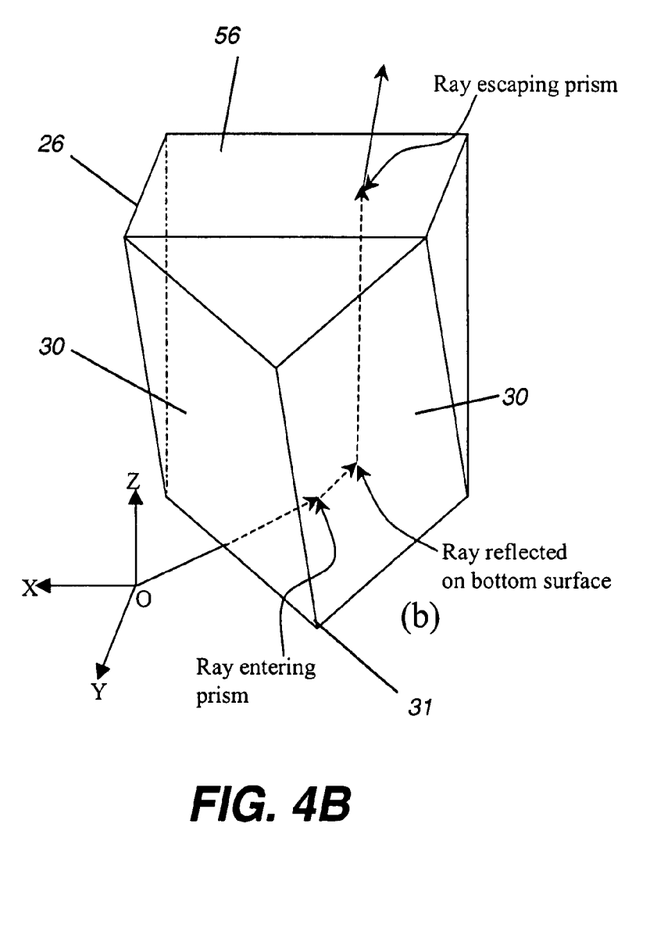

The background section above described the light redirection capability of conventional prism 60 structures with reference to FIGS. 3A and 3B. Referring now to FIGS. 4A and 4B there is shown, by comparison, the behavior of a roof prism structure 26 for handling light incident on a receiving facet 52 at incident point P1. The light is refracted, then reflected from a roof facet 30, and then exits at an output facet 56. For understanding the functions of roof prism structure 26 in the present invention, it is instructive to compare the behavior of conventional prism 60 of FIGS. 3A and 3B with roof prism structure 26 of FIGS. 4A and 4B. Relative to the X-Y-Z coordinate axes shown, conventional prism 60 redirects light rays along the Y-direction. However, conventional prism 60 does not collect light along the X-direction. Thus, a turning film article using conventional prism 60 structures must be used in combination with a separate mechanism for collimating light in the X-direction. In contrast, roof prism structure 26 of the present invention provides both collimation of light along the Y-axis, thereby reducing the divergence angle of light relative to the Y-axis, and redirection of the light toward the Z-axis. The present invention takes advantage of this dual-function capability of roof prism structures 26 in order to provide a turning film that does not require a supplementary collimation film.

Parameters of particular interest for determining the behavior of roof prism structure 26 include the following:
  (i) index of refraction. In general, the material of which roof prism structure 26 is formed should have an index of refraction of 1.4 or greater.
  (ii) ridge angle $\alpha$. This parameter gives the inclination angle of a ridge 31 that is formed at the intersection of roof facets 30, relative to a normal to output facet 56. Ridge angle $\alpha$ grows shallower with increasing height of roof prism structure 26, relative to output facet 56. The recommended range for ridge angle $\alpha$ is 35-45 degrees.
  (iii) peak angle $\beta$. This parameter refers to the angle at which roof facets 30 intersect at ridge 31. The recommended range is 60-80 degrees.

Figure 5A:
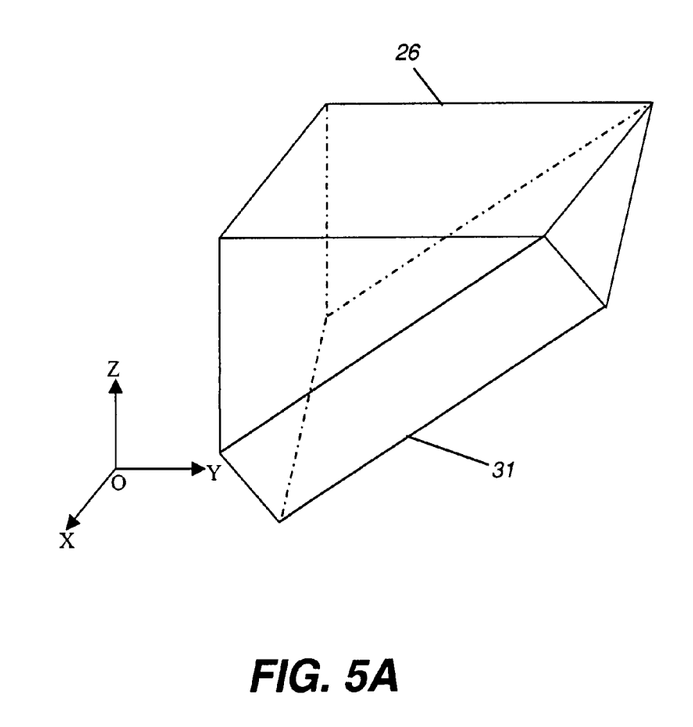
FIGS. 5A and 5B are perspective views showing the geometrical arrangement of a roof prism structure according to the present invention.
Figure 5B:
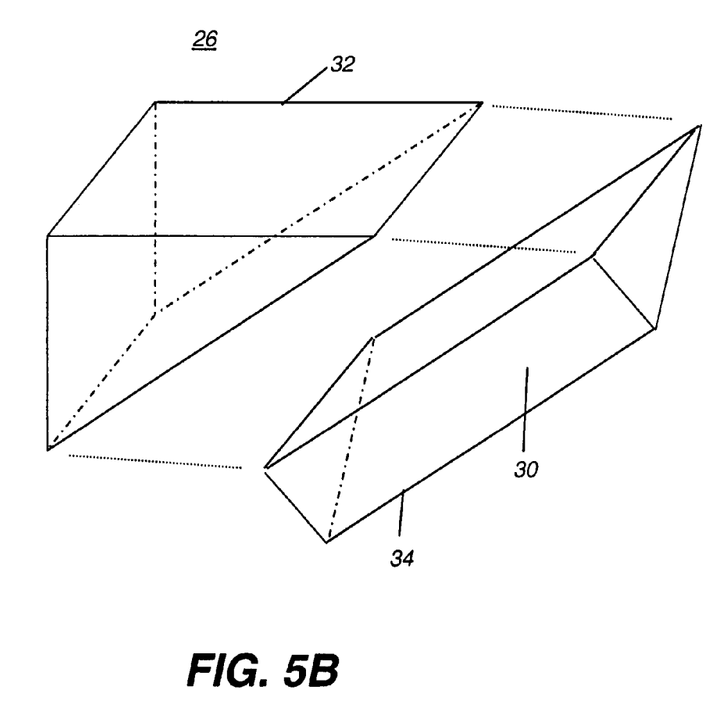

FIGS. 5A and 5B are provided to assist in visualizing the overall geometrical shape of roof prism structure 26. As shown in FIGS. 5A and 5B, roof prism structure 26 can be considered as if formed by joining two constituent prisms: a roof section 34 and a base section 32. In an actual embodiment, roof prism structure 26 is molded or otherwise formed as a single piece, rather than being formed from two separate component prisms; FIGS. 5A and 5B are an aid to visualization only. Base section 32 in the embodiment of FIGS. 5A and 5B has the shape of a diagonally sectioned rectangular cube. Roof section 34 has a roof shape with two slanting roof facets 30.

Figure 6:
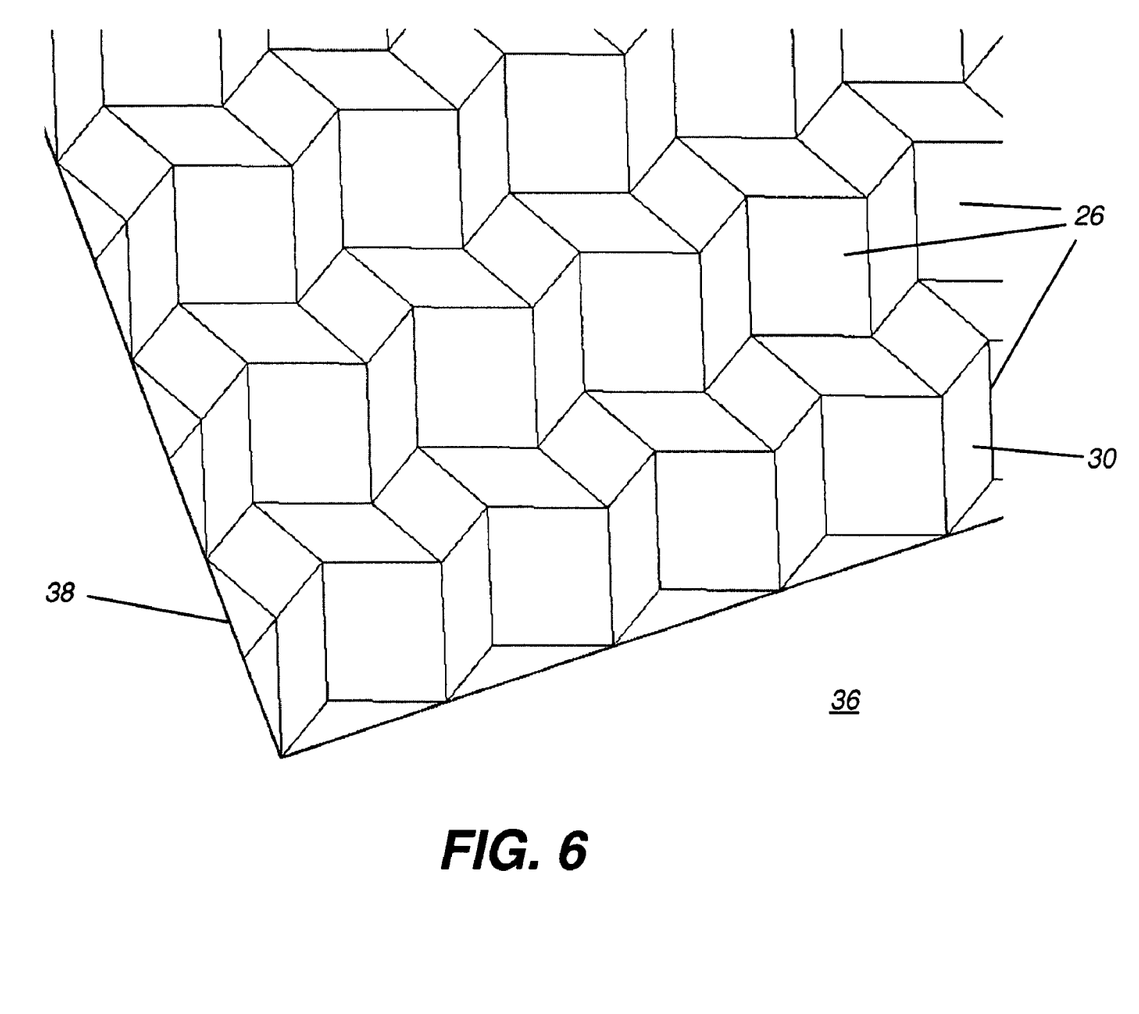
FIG. 6 is a perspective view of an array of roof prism structures on a turning film of the present invention.
Figure 7:
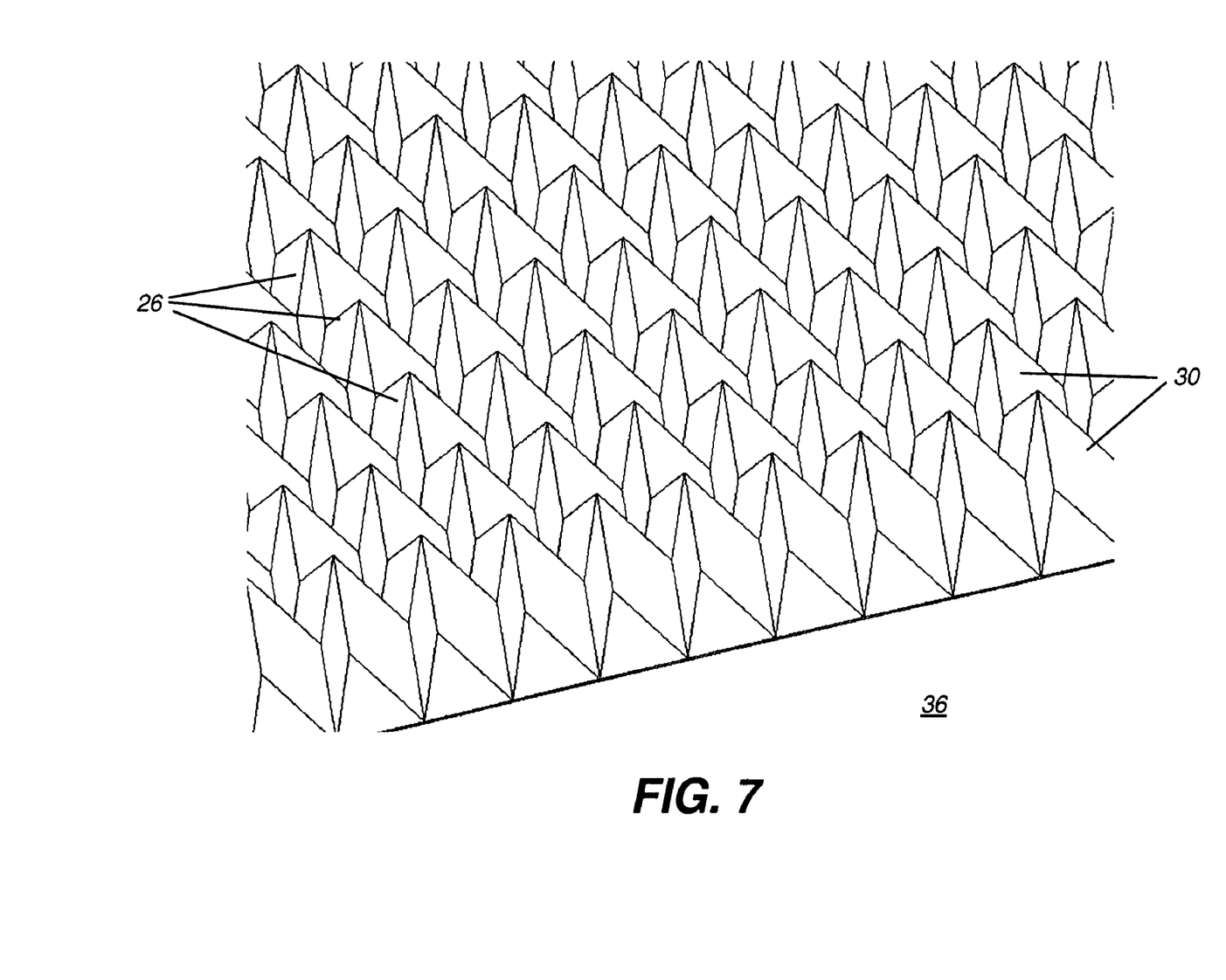
FIG. 7 is an alternate perspective view of an array of roof prism structures on a turning film of the present invention.
Figure 8:
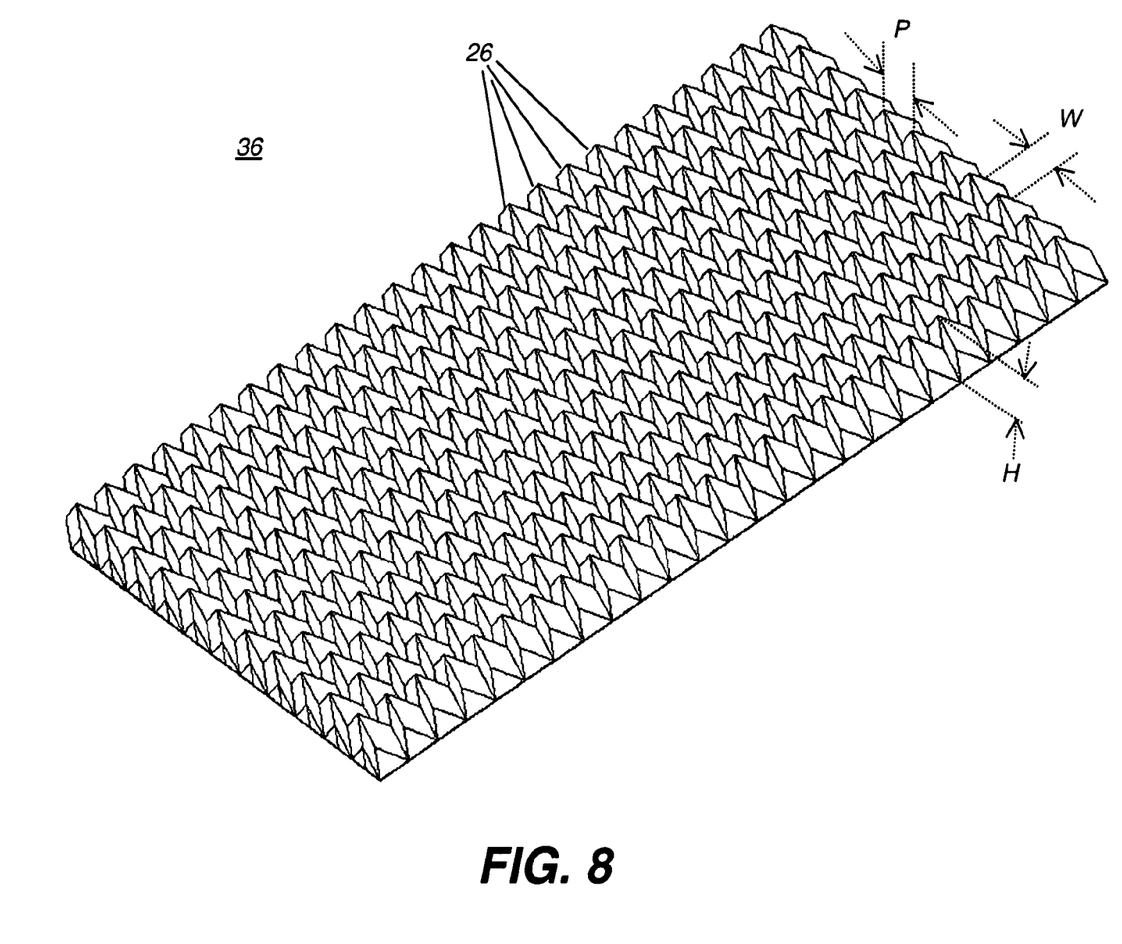
FIG. 8 is a perspective view of an array of roof prism structures on a turning film of the present invention.

Referring to FIGS. 6, 7, and 8, there are shown perspective views of a turning film 36 in various embodiments of the present invention, from the light input side. As these figures show, turning film 36 has, over its input surface, a number of of roof prism structures 26 arranged in a two-dimensional array. Turning film 36 has an output surface 38 that is substantially planar. Referring back to FIGS. 4A and 4B, output facet 56 for each roof prism structure 26 lies along output surface 38 of turning film 36. Roof facets 30 are inclined inward, toward light guiding plate 10 (FIGS. 1 and 2) at ridge angle $\alpha$ (FIG. 4A). The inclination of ridge angle $\alpha$ is relative to a normal to turning film 36.

As is shown in FIG. 8, the pitch P between roof prism structures 26 should be approximately equal to width W of prism structures 26. The recommended range for pitch P is 20~100 microns. The width W also has same range. The distance between two adjacent peaks of prism structure 26 also has approximately equal range. The height H ranges from 20~200 microns.

Figure 9:
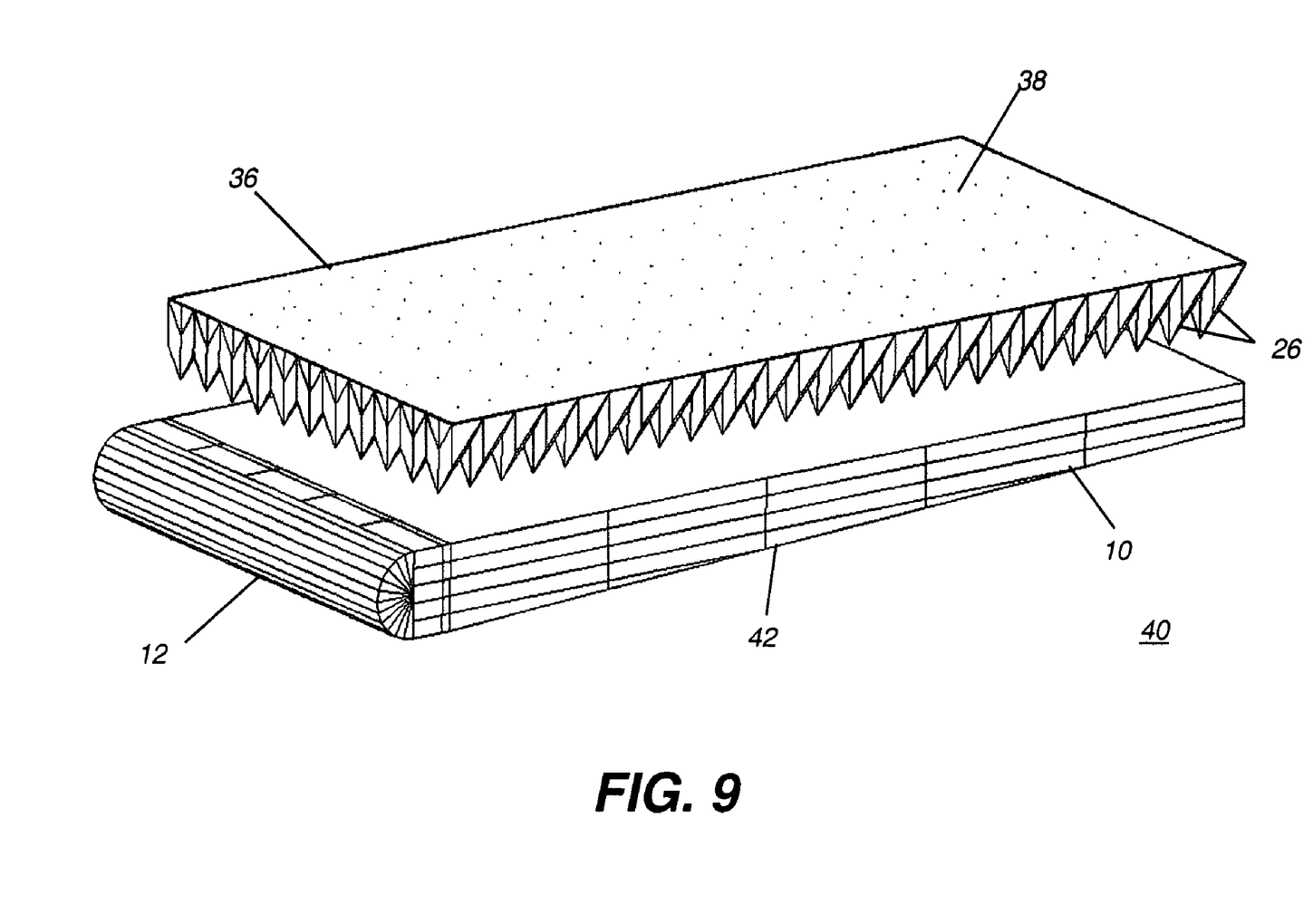
FIG. 9 is a top perspective view showing a turning film according to the present invention, as used with a light guiding plate.
Figure 10:
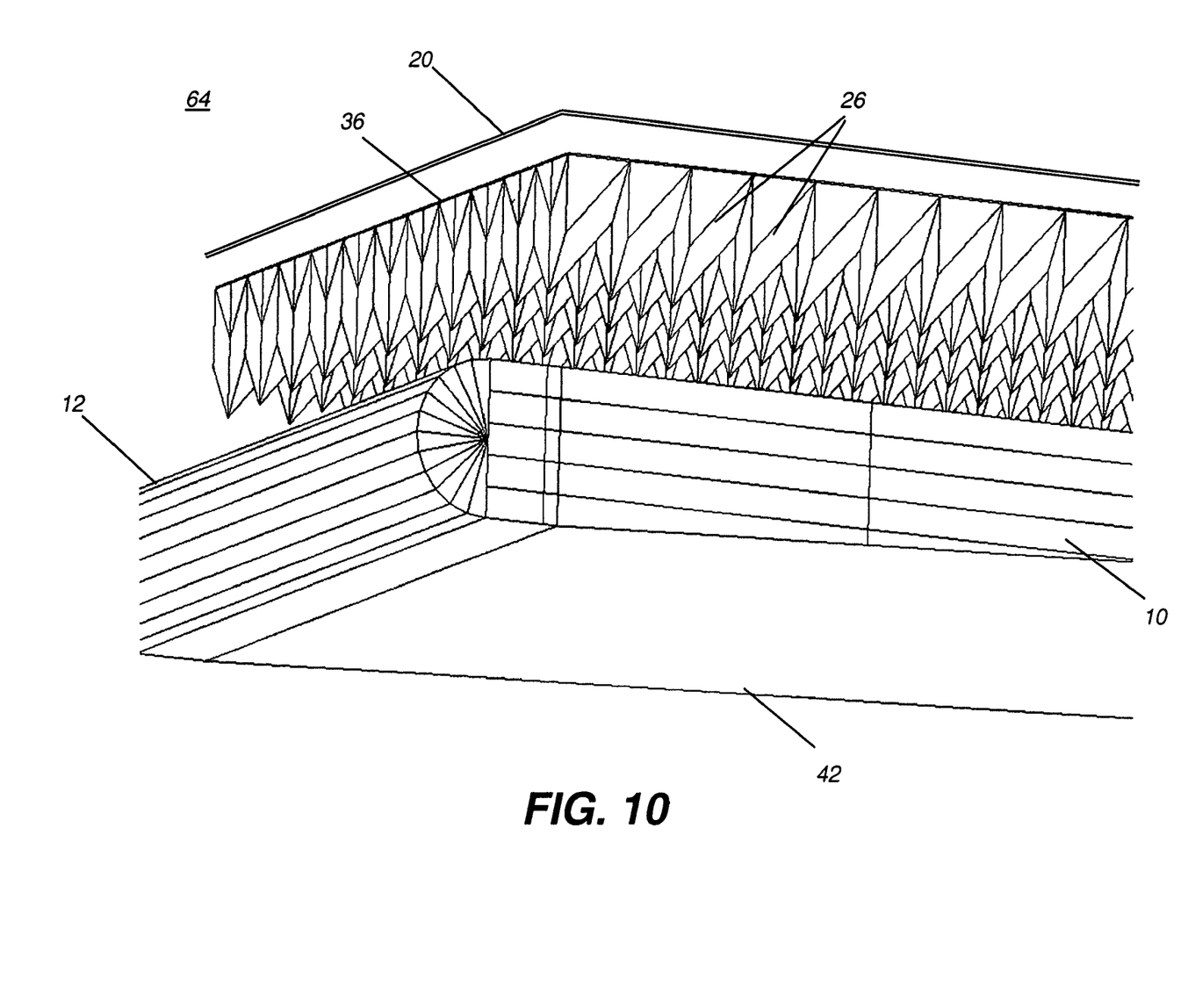
FIG. 10 is a bottom-side perspective view showing a turning film according to the present invention, with its orientation when used with a light guiding plate; and, FIG. 11 is a graph comparing luminance characteristics of the turning film of the present invention with luminance provided by conventional brightness enhancement articles.

Referring to FIG. 9 and to the bottom perspective view of a display apparatus 64 in FIG. 10, there are shown different perspective views of an illumination system 40 using turning film 36 of the present invention. Light from light guiding plate 10 is directed toward turning film 36, as described above. Turning film 36 provides both collimation and redirection of the light received, providing light at output surface 38 for backlighting or other functions. The use of turning film 36 configured with an array of roof prism structures 26 eliminates the need for a structure having separate bottom prisms 24, as was shown in FIG. 2.

Fabrication Methods

Turning film 36 of the present invention is preferably fabricated from a flexible, transparent material, most preferably from a polymeric material. There are a number of suitable polymers having high light transmission properties, and being inexpensive and adaptable to microreplication processes. Suitable materials include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used. The array of roof prism structures 26 can be formed by various molding methods, including extrusion film casting, for example. In extrusion film casting, a polymer or polymer blend is melt extruded through a slit die, T-die, coat-hanger die, or other suitable mechanism. The extruded web having the preferred geometry is then rapidly quenched to below its glass solidification temperature upon a chilled casting drum so that the polymer retains the shape of the roller geometry. The film of the invention may also be manufactured by vacuum forming around a pattern, injection molding of the lenses using UV curable materials coated on a web then cured, and embossing in a polymer web.

Luminance Improvements

Figure 11:
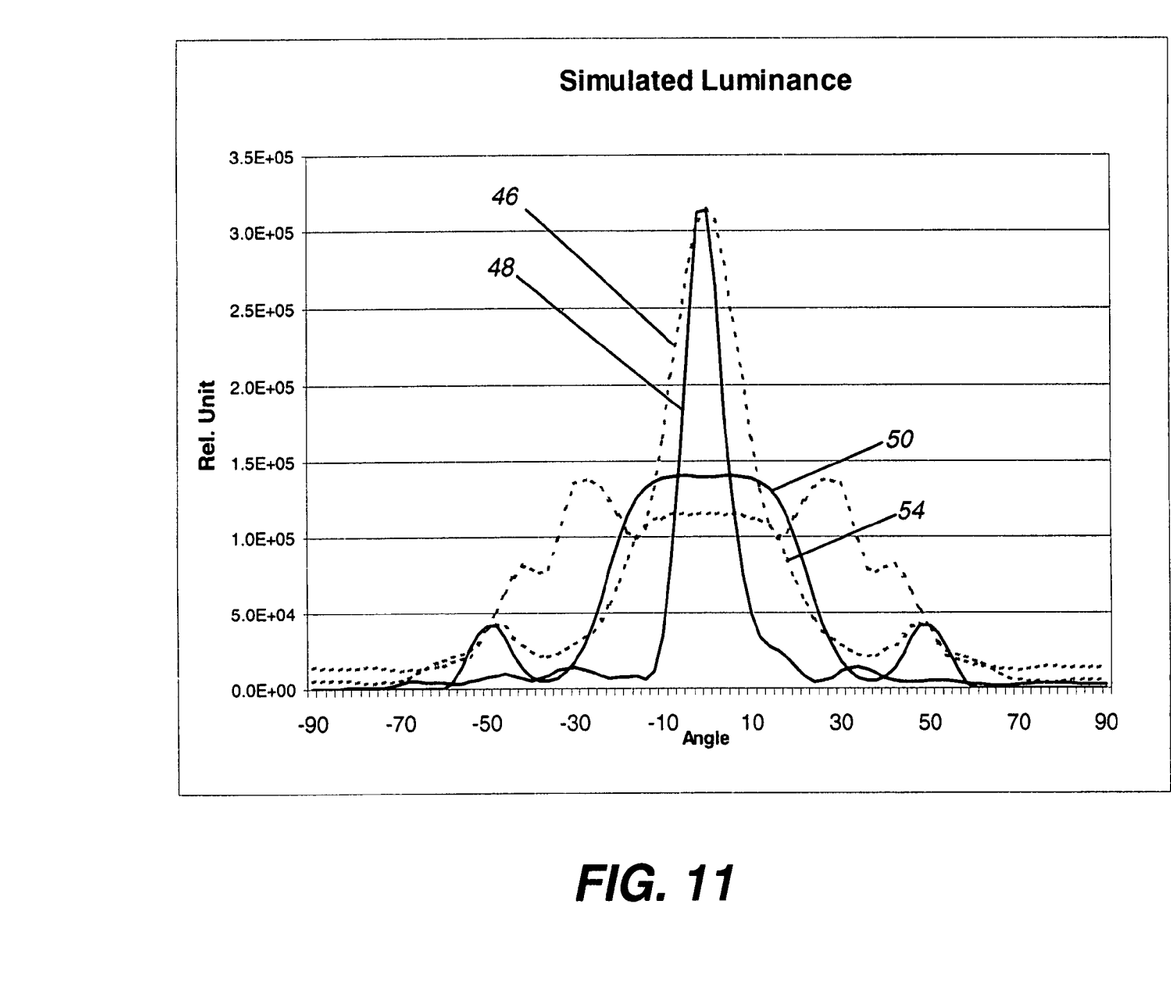

Luminance curves 46, 48, 50, and 54 in FIG. 11 compare relative luminance for a range of angles for turning film 36 of the present invention against conventional brightness enhancement film solutions currently used for display backlighting applications. Curves 46 and 48 show the luminance characteristics of turning film 36 at orthogonal angles relative to output surface 38. Curves 50 and 52 show the luminance characteristics of conventional films. As is seen from FIG. 11, there is a substantial gain in on-axis luminance for turning film 36 when compared against components currently in use.

Thus, it can be seen that turning film 36 of the present invention not only provides, in a single article, the functions of both collimation and redirection, but also provides improved on-axis brightness over conventional types of brightness enhancement solutions.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, a number of different arrangements of roof prism structures 26 are possible within turning film 36. Roof prism structures 26 could vary dimensionally over a range. An uneven spatial distribution could be beneficial for improved uniformity. Turning film 36 of the present invention could be used with a number of different light sources, including lasers, LEDs, or CCFL sources. Turning film 36 could be used with other types of components for conditioning uniformity and brightness, including diffusers, polarizers, etc. Turning film 36 is compatible with any of a number of light-gating devices 20, including spatial light modulators, such as LCDs and Digital Micromirror Devices (DMDs), also termed Digital Light Processing (DLP) components.

Thus, what is provided is an apparatus and method for forming two-dimensional turning film employing an array of roof prism structures to collect and redirect light from a light guiding plate.

PARTS LIST

10. Light guiding plate
12. Light source
14. Light redirecting surface
16. Output surface
18. Input surface
20. Light gating device
22. Turning film
24. Bottom prisms
26. Roof prism structure
28. Output face
30. Roof facet
31. Ridge
32. Base section
34. Roof section
36. Turning film
38. Output surface
40. Illumination system
42. Reflective surface
44. Bottom surface
46, 48, 50, 54. Luminance curve
52. Receiving facet
56. Output facet
60. Prism
62. Bottom facet
64. Display apparatus

The invention claimed is:

1. An optical turning film for providing light redirection, comprising:
    (a) an input surface on the turning film for accepting incident light comprising a plurality of roof prism structures arranged in a two-dimensional array;
    (b) a substantially planar output surface on the turning film; and
wherein the roof prism structures further comprises a base section and a roof section, the base section having a shape of a diagonally sectioned rectangular cube and the roof section has a roof shape with two slanting roof facets.

2. The optical turning film according to claim 1 wherein, relative to a normal to the output surface of the turning film, roof prism facets for the roof prism structures are inclined at an angle between 25 and 60 degrees.

3. The optical turning film according to claim 1 wherein said, relative to a normal to the output surface of the turning film, roof prism facets for the roof prism structures are inclined at an angle between 35 and 45 degrees.

4. The optical turning film according to claim 1 wherein roof prism facets for each of the roof prism structures intersect at an angle between 50 and 100 degrees.

5. The optical turning film according to claim 1 wherein roof prism facets for each of the roof prism structures intersect at an angle between 60 and 80 degrees.

6. The optical turning film according to claim 1 fabricated from any of a group of materials including polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, polyolefin ionomers, copolymers, and polymer mixtures.

7. An optical turning film for providing light collimation along a first direction and light redirection in a second direction substantially orthogonal to the first direction, the optical turning film comprising a plurality of roof prism structures arranged in a two-dimensional array, wherein the roof prism structures further comprises a base section and a roof section, the base section having a shape of a diagonally sectioned rectangular cube and the roof section has a roof shape with two slanting roof facets, wherein each roof prism structure further comprises: (i) an output facet substantially coplanar with the output surface of the turning film; (ii) an input facet for accepting incident light, the input facet substantially orthogonal to the output facet; (iii) roof facets meeting at a ridge, the roof facets intersecting at a peak angle in the range from about 60 to about 80 degrees; wherein the roof facets are inclined, relative to a normal to the output facet, at a ridge angle between about 25 and 60 degrees from normal.

8. The optical turning film according to claim 7 wherein the roof facets are inclined, relative to a normal to the output facet, at a ridge angle between about 35 and 45 degrees from normal.

9. The optical turning film according to claim 7 fabricated from any of a group of materials including polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, polyolefin ionomers, copolymers, and polymer mixtures.

* * * * *